Figure 1:
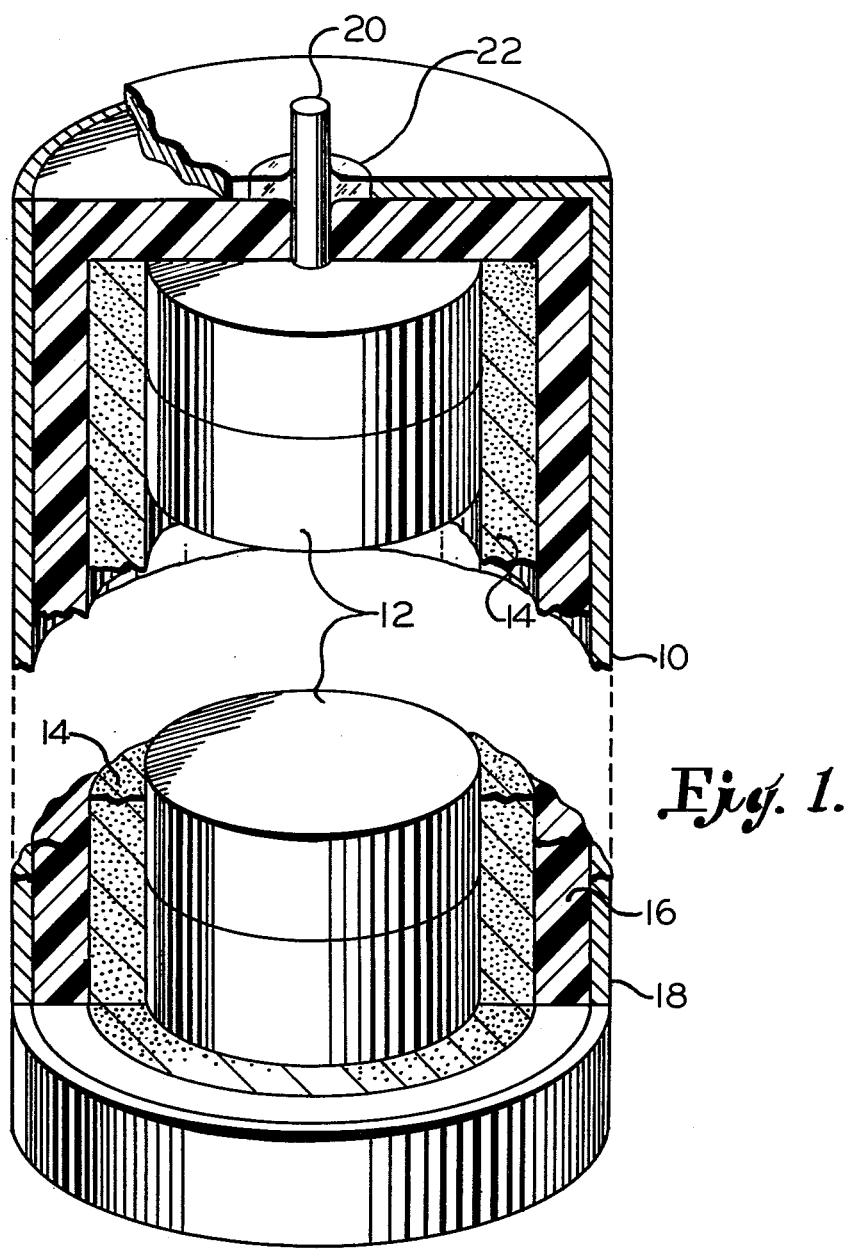

United States Patent
Zellhoefer

[11] 3,954,504
[45] May 4, 1976

[54] FUSED ELECTROLYTE CELL AND METHOD OF MAKING THE SAME

[75] Inventor: Glenn Faber Zellhoefer, Normal, Ill.

[73] Assignee: National Union Electric Corporation, Greenwich, Conn.

[22] Filed: June 18, 1956

[21] Appl. No.: 593,015

Related U.S. Application Data

[63] Continuation-in-part of Ser. No. 536,685, Sept. 23, 1955.

[52] U.S. Cl. ................................ 136/90; 136/153
[51] Int. Cl.² ......................................... H01M 6/36
[58] Field of Search ............................. 136/90, 153

[56] References Cited
UNITED STATES PATENTS

| | | | |
|---|---|---|---|
| 1,896,853 | 2/1933 | Taylor | 75/208 |
| 2,081,926 | 6/1937 | Gyuris | 136/83 |
| 2,102,701 | 12/1937 | Gyuris | 136/83 |
| 2,707,199 | 4/1955 | Ruben | 136/83 |
| 2,762,858 | 9/1956 | Wood | 136/153 |

FOREIGN PATENTS OR APPLICATIONS
122,224    8/1947    Australia

OTHER PUBLICATIONS
Vival "Primary Batteries" 1950 pp. 324–329.
Goodrich et al. "J. of Electrochem. Soc." Vol. 99 pp. 207C, 208C Aug. 1952.

*Primary Examiner*—Verlin R. Pendegrass
*Attorney, Agent, or Firm*—Hibben, Noyes & Bicknell, Ltd.

EXEMPLARY CLAIM

1. A fusible salt electrolyte cell system including a cathode, an anode, and a mass of non-fused electrolyte in contact therewith and wherein said cathode and electrolyte components essentially consist of a series of layers of powders compressed under a pressure of the order of 50,000 to 60,000 p.s.i. into a single pellet with adjacent layers intimately united, said electrolyte being admixed with dehydrated kaolinite in a sheet layer crystalline structure form, which is present throughout the mass of electrolyte in an amount sufficient to impart nonflow characteristics to the fused electrolyte so as to maintain the electrolyte against substantial displacement under pressure when the electrolyte is fused thereby to retain the fused electrolyte in intimate contact with said anode, and heat source material adjacent said electrolyte and adapted to release heat in an amount adequate to fuse said electrolyte so as to activate the cell.

14 Claims, 2 Drawing Figures

U.S. Patent   May 4, 1976   3,954,504

INVENTOR.
GLENN F. ZELLHOEFER
BY
E. J. Balluff

FUSED ELECTROLYTE CELL AND METHOD OF MAKING THE SAME

The present application is a continuation-in-part of my prior co-pending application, Ser. No. 536,685, filed Sept. 23, 1955, for Thermal Cell And Method Of Making The Same.

This invention relates for the electrolyte cells and a method of making the same.

Fused electrolyte cells to which the invention relates are electrochemical power supplies based upon electrolytes of various inorganic salts which remain solid and non-conducting at all storage temperatures. When the cell is heated to an elevated temperature, the electrolyte fuses and becomes conducting and electrical energy may then be withdrawn from the system.

Principal objects of the invention are to provide a new and improved fused electrolyte cell and components thereof and a novel and simple method of making the same.

Figure 2:
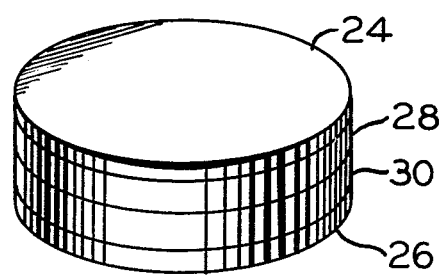

Other objects and advantages of the invention will be apparent from the following specification and the accompanying sheet of drawings in which:

FIG. 1 is a fragmentary partial sectional view illustrating an assembly of a series of cells embodying my invention; and FIG. 2 is an elevation view of a single cell embodying my invention.

Cells embodying the invention employ fused salt electrolytes such as LiCl-KCl; or $CdCl_2$-NaCl-KCl; or $CaCl_2$NaCl-KCl, with a suitable depolarizing agent; and may use a variety of anodes such as magnesium, calcium, or a Li-Pb alloy containing from about 8 to about 15% by weight of Li. LiCl-KCl is preferred as an electrolyte because of the excellence of the results in using it.

Such cell further includes a cathode essentially comprising a layer formed by compressing a fused, granulated and sifted solid solution of $B_2O_3$ and $V_2O_5$, said $B_2O_3$ comprising at least 5% by weight of the combined weight of $B_2O_3$ and $V_2O_5$; and an anode essentially comprising pressed, powdered metal selected from the group consisting of magnesium, calcium, and said Li-Pb alloy.

Good results may be obtained where the percentage of $B_2O_3$ in the cathode electrode contains from about 16 to about 28% by weight of the combined weight of the $B_2O_3$ and $V_2O_5$ components of such layer, and 20% $B_2O_3$ has been found to give excellent results.

Preferably the components of the cell comprises a series of layers of powders compressed into a single pellet with adjacent layers intimately united. Such cell is formed according to the invention by using a powdered material for each of the components, stacking the material in layers and compressing the layers to form a single integral pellet with adjacent layers intimately united.

FIG. 1 illustrates a battery 10 consisting of a series of cells 12 of the type embodying the invention. As illustrated in FIG. 1 the cells 12 may be arranged in series in a stack which may employ any desired number of cells and with heat source material 14 surrounding the cells 12 for heating the same to an elevated temperature for activating the cells. The heat source material 14 may be covered by a layer 16 of suitable insulation which in turn is housed in a suitable container 18. Conventional ignition means may be used for igniting the material 14. A terminal 20 operatively connected with the end cell of the stack projects from the casing 18 through a suitable hermetic seal 22 while the other terminal (not shown) may project through the opposite end of the case 18.

As shown in FIG. 2 each cell preferably comprises a cathode 24 and an anode 26 separated by and in contact with an electrolyte, the electrolyte preferably consisting of a cathode layer 28 and an anode layer 30. The cathode layer of the electrolyte 28 preferably consists of equal parts of KCl and LiCl admixed with an adsorbing agent such as Kaolin, and a depolarizing agent. For example; the cathode layer 28 may consist of 19% KCl, 19% LiCl and 62% of $V_2O_5$ plus kaolin, when required, in an amount sufficient to retard and/or prevent the flow of electrolyte when the same fuses without interfering with the wetting of the cathode 24 by the electrolyte. I have obtained good results when the adsorbent comprises up to about 25% of the cathode layer 28.

The anode layer 30 of electrolyte preferably consists of equal parts of KCl and LiCl and an adsorbing agent of the character previously described admixed therewith. The adsorbent may comprise approximately 40% to 50% by weight of the anode layer 30. Preferably the anode layer is substantially free of a depolarizing agent. The percentage of the adsorbent or nonflow agent used in any case depends upon the design of the cell and the amount required to retard or prevent the flow of electrolyte when the cell is activated and subjected to conditions of use and for some applications it may be feasible or desirable to omit the adsorbing agents in the cathode layer 28.

Reference may be had to my prior copending applications, Ser. No. 406,542 and 406,543 filed Jan. 27, 1954 for other specific examples of salt mixtures suitable for use as electrolytes with the depolarizer, electrodes, and adsorbent herein referred to.

As disclosed in my prior application, Ser. No. 536,655, the adsorbing material may be prepared by employing a commercial grade of kaolin ($Al_2O_3$-$2H_2O$-$2SiO_2$ — a native aluminum silicate) which is spread in a shallow tray to a uniform depth of about 1 cm and then heated to 585°–600°C for 4 hours to remove moisture and water of hydration.

For the anode layer 30 dry KCl-LiCl and dehydrated kaolin, prepared as above indicated and admixed in weight proportions as above indicated is ball milled. For the cathode layer 28 dry KCl-LiCl-$V_2O_5$ and dehydrated kaolin are mixed in the weight proportions as heretofore stated and ball milled. As an aid in securing uniformity of results, I have found that it is is desirable to compress the powder used in forming the cathode layer 28 of electrolyte into a slug of desired density and then granulate such material before pressing the layers of powder to form the pellet. It is also desirable to employ the same technique for the powdered material used to form the anode layer 30 and the anode 26.

For the cathode 24 the $B_2O_3$ and $V_2O_5$ in powdered form should be fused and solidified, then granulated and sifted to obtain a powder suitable for use in forming the cathode 24.

In forming the pellet the powdered material forming the components of the cell and prepared as above indicated, is stacked in a suitable die with the material arranged so as to form an anode 26, an anode layer 30 of electrolyte, a cathode layer 28 of electrolyte and a cathode 24. The thickness of each layer should be uniform. The layers of stacked powdered material are then subjected to a pressure of the order of 50,000 to 60,000 psi to form a four layer pellet with each of the layers intimately united with the adjacent layers. A pellet of 0.25 inch diameter and the length of 0.080 inch has been found to give good results where the cathode layer 24 is 0.010 inch, the cathode layer 28 of electrolyte is 0.028 inch, the anode layer of electrolyte is 0.027 inch and the anode is 0.015 inch.

The optimum ratio the he layers of the cell depends upon the operating conditions of the cell.

The use of two layers 28 and 30 of electrolyte is for the purpose of improving the electrochemical properties of the electrolyte and permits the use of a higher concentration of depolarizing agent in the cathode layer 28 than is the case when a single layer of electrolyte used.

While I prefer to form and compress all of the components of the cell into a single pellet in one operation, I contemplate that some of the components may be individually compressed into pellets which may then be assembled into a single cell, and in addition I contemplate that the anode may consist of a sheet of material such as magnesium or calcium in lieu of a layer of compressed powder.

However, regardless of the form of the anode, it must be intimately joined with the adjacent electrolyte.

A KCl-LiCl cell as disclosed herein will produce a no load voltage of about 2.75 to 2.90 volts throughout a temperature range of 360° to 520°C. The heating of the cell is effected by the ignition of the heat source material 14.

I have described the principles of my invention by way of example and desire to avail myself of such changes as fall within the scope of the following claims.

I claim:

1. A fusible salt electrolyte cell system including a cathode, an anode, and a mass of non-fused electrolyte in contact therewith and wherein said cathode and electrolyte components essentially consist of a series of layers of powders compressed under a pressure of the order of 50,000 to 60,000 p.s.i. into a single pellet with adjacent layers intimately united, said electrolyte being admixed with dehydrated kaolinite in a sheet layer crystalline structure form, which is present throughout the mass of electrolyte in an amount sufficient to impart nonflow characteristics to the fused electrolyte so as to maintain the electrolyte against substantial displacement under pressure when the electrolyte is fused thereby to retain the fused electrolyte in intimate contact with said anode, and heat source material adjacent said electrolyte and adapted to release heat in an amount adequate to fuse said electrolyte so as to activate the cell.

2. A cell according to claim 1 wherein said electrolyte component comprises a cathode layer admixed with a depolarizing agent and an anode layer substantially free of depolarizing agent.

3. A cell system according to claim 1 wherein said cathode, electrolyte, and anode components essentially consist of a series of layers of powders compressed into a single pellet with adjacent layers intimately united.

4. A cell system according to claim 1 wherein each of said components of said cell consists essentially of a layer of powdered material and wherein said layers are compressed into a single pellet with adjacent layers intimately united.

5. A cell according to claim 4 wherein said electrolyte component comprises a cathode layer admixed with a depolarizing agent and an anode layer substantially free of depolarizing agent.

6. A cell according to claim 1, wherein the powder which forms said cathode consists of a solid solution of $B_2O_3$ and $V_2O_3$ and wherein said $B_2O_3$ comprises at least 5% by weight of the combined weight of said $B_2O_3$ and $V_2O_5$.

7. A fusible salt electrolyte cell system includng a cathode and an anode separated by and in contact with a mass of non-fused electrolyte, wherein said cathode essentially consists of a pressed layer of powdered material compressed under a pressure of the order of 50,000 to 60,000 p.s.i. and formed from a solid solution of $B_2O_3$ and $V_2O_5$ and wherein said $B_2O_3$ comprises at least 5% by weight of the combined weight of said $B_2O_3$ and $V_2O_3$.

8. A cell according to claim 7 wherein said electrolyte comprises a cathode layer of LiCl-KCl admixed with $V_2O_5$ and an anode layer of LiCl-KCl admixed with an adsorbing agent, but substantially free of a depolarizing agent and wherein said anode comprises a material selected from the group consisting of Mg, Ca and a Pb-Li alloy containing from about 8 to about 15% by weight of Li, said adsorbing agent consisting of dehydrated kaolinite in a sheet layer crystalline structure form.

9. A cell according to claim 7 wherein said electrolyte consists of an anode layer of electrolyte salts admixed with dehydrated kaolinite in a sheet layer crystalline structure form present in an amount sufficient to impart non-flow characteristics to the anode layer of electrolyte salts when fused and a cathode layer of electrolyte salts admixed with $V_2O_5$ and substantially free of kaolinite.

10. In the art of making a fusible salt electrolyte cell including a cathode and an anode and a non-fused electrolyte salt mixture which is nonconducting at normal ambient temperatures, that method which includes the steps of using powdered material for each of said components, admixing with the powdered electrolyte material dehydrated kaolinite in a sheet layer crystalline structure form, in an amount sufficient to prevent the flow of electrolyte when the same is fused, stacking said material in layers, and compressing said layers to unite the same and form a single integral pellet with adjacent layers intimately united.

11. That method according to claim 10 wherein said material which forms said cathode consists of a powdered material formed from a solid solution of $B_2O_3$ and $V_2O_5$ and wherein said $B_2O_3$ comprises at least 5% by weight of the combined weight of said $B_2O_3$ and $V_2O_5$.

12. That method according to claim 10 wherein the cathode comprises a solid solution of $B_2O_3$ - $V_2O_5$, the electrolyte comprises LiCl and KCl and the anode comprises a material selected from the group consisting of Mg, Ca and a LiPb alloy containing from about 8 to about 15% by weight of Li.

13. In the art of making a fusible salt electrolyte cell including a cathode and an anode and a non-fused electrolyte salt mixture which is non-conducting at normal ambient temperatures, that method which consists of using powdered material for each of said electrodes and electrolyte components, admixing with the powdered electrolyte material dehydrated kaolinite in a sheet layer crystalline form in an amount sufficient to prevent the flow of electrolyte when the same is fused, stacking said material in layers and compressing said layers to unite the same and form a single integral pellet with adjacent layers intimately united.

14. A fusible salt electrolyte cell system including a cathode, an anode, and a mass of non-fused electrolyte in contact therewith and wherein said cathode and electrolyte components essentially consist of a series of layers of powders compressed under a pressure of the order of 50,000 to 60,000 p.s.i. into a single pellet with adjacent layers intimately united, said electrolyte consisting of an anode layer of electrolyte salts admixed with dehydrated kaolinite in a sheet layer crystalline structure form, which is present throughout the mass of such electrolyte salts in an amount sufficient to impart non-flow characteristics to the fused electrolyte so as to maintain the anode layer of electrolyte against substantial displacement under pressure when the electrolyte is fused thereby to retain the fused electrolyte in intimate contact with said anode, and a cathode layer of electrolyte salts admixed with $V_2O_5$ and substantially free of kaolinite and heat source material adjacent said electrolyte and adapted to release heat in an amount adequate to fuse said electrolyte so as to activate the cell.

* * * * *

UNITED STATES PATENT OFFICE
CERTIFICATE OF CORRECTION

PATENT NO. : 3,954,504
DATED : May 4, 1976
INVENTOR(S) : Glenn F. Zellhoefer

It is certified that error appears in the above-identified patent and that said Letters Patent are hereby corrected as shown below:

Column 4, line 7, "$V_2O_3$" should read --$V_2O_5$--;
      line 10, "includng" should read --including--;

line 18, "$V_2O_3$" should read --$V_2O_5$--;
      line 46, after "layers" (second occurrence) insert --under a pressure of the order of 50,000 to 60,000 psi--.

Column 5, line 3, after "layers" insert --under a pressure of the order of 50,000 to 60,000 psi--.

Signed and Sealed this

Thirty-first Day of August 1976

[SEAL]

Attest:

RUTH C. MASON
*Attesting Officer*

C. MARSHALL DANN
*Commissioner of Patents and Trademarks*